UNITED STATES PATENT OFFICE.

CLAY LITTLETON, OF HOPEWELL, VIRGINIA.

PROCESS FOR TREATING AND RECOVERY FOR REUSE OILS, RESINS, GUMS, &c., WHICH HAVE BEEN HARDENED.

1,398,438. Specification of Letters Patent. Patented Nov. 29, 1921.

No Drawing. Application filed January 27, 1921. Serial No. 440,532.

*To all whom it may concern:*

Be it known that I, CLAY LITTLETON, a citizen of the United States, and a resident of Hopewell, in the county of Prince George and State of Virginia, have invented certain new and useful Improvements in Processes for Treating and Recovery for Reuse Oils, Resins, Gums, &c., Which Have Been Hardened, of which the following is a specification.

My invention relates to the recovery and use of the oils, resins, gums, and the like, which have been used as paints or varnishes, or which has been otherwise dried or hardened; and it is applicable to a great variety of substances, some of which are linseed, Chinese wood, and similar drying oils, colophony, copal, sandarac and "Cumar."

Generally stated, my process consists in dispersing, that is dissolving or suspending the hardened or dried material in an alkaline solution and there treating it with active chlorin, and then exposing the treated material to a current of air. The so treated material may be ground up; and it is then dissolved in a suitable solvent, such as alcohol if it is to be used for coating purposes.

In the recovery of varnish from varnished threads, for example, I proceed by cooking up the threads with an alkaline solution for the purpose of dissolving the varnish. A variety of alkaline substances are effective for my purpose, some of them being sodium carbonate; borate or hydroxid; or ammonium carbonate or hydroxid. For various reasons, such as efficiency of operation, cost, etc., I prefer to use the sodium carbonate. The solution so obtained may be separated from solid impurities by drawing off, settling and filtering, and is then treated with active chlorin. The active chlorin may be used in any form, as gas, in solution, or in the nascent state. Again, for reasons such as efficiency of operation, cost, etc., I prefer to use the chlorin in the form of sodium or calcium hypochlorite in solution, which solution is mixed with the solution or suspension of the material being treated.

When the chlorin is used in the gaseous condition the gas is led directly into the alkaline solution containing the coating material which has been removed from the coated objects.

After the treatment with active chlorin, I precipitate the treated material from its solution with an acid, preferably sulfuric acid or sulfur dioxid, although many other acids may be used, if desired. The precipitated masses are spread out in the air to dry, which step serves to remove the entrained water and to produce a hardening effect on the material under treatment, after which the material may be ground up, and further dried, if necessary.

My product, so obtained, has qualities which make it desirable as a binder in plastic compositions; and when dissolved in alcohol or other suitable solvent makes a quick drying varnish having the desirable properties of oil varnishes and the quick drying property of spirit varnishes. My varnishes are hard but not brittle, and have insulating properties.

What I claim is:

1. The process of recovering a hardened coating material for re-use, which comprises dispersing it in an alkaline solution, treating the solution with active chlorin, removing the coating material body from the solution and drying and air treating the precipitate.

2. The process of recovering a hardened coating material for re-use, which comprises dissolving it in an alkaline solution, treating the solution with active chlorin, precipitating the coating material body from the solution and drying and air treating the preciptiate.

3. The process of recovering a hardened coating-material for re-use which comprises dispersing it in an alkaline solution, mixing active chlorin therewith, mixing an acid therewith, and drying and air treating the precipitate.

4. The process of recovering a hardened coating material, for re-use which comprises dissolving it in an alkaline solution, mixing active chlorin therewith, mixing an acid therewith, and drying and air treating the precipitate.

CLAY LITTLETON.